United States Patent [19]

Moke

[11] Patent Number: 4,571,949
[45] Date of Patent: Feb. 25, 1986

[54] COGENERATION AND SLUDGE DRYING SYSTEM

[76] Inventor: Harold C. Moke, 1420 Walnut Bend, Houston, Tex. 77042

[21] Appl. No.: 724,811

[22] Filed: Apr. 18, 1985

[51] Int. Cl.$^4$ .............................................. F01K 23/04
[52] U.S. Cl. ......................................... 60/655; 60/648
[58] Field of Search ................. 60/39.07, 39.182, 648, 60/655, 650, 682, 683

[56] References Cited

U.S. PATENT DOCUMENTS

| 4,414,813 | 11/1983 | Knapp | 60/648 X |
| 4,441,437 | 4/1984 | Moskau | 60/648 X |
| 4,492,085 | 1/1985 | Stahl et al. | 60/655 X |

*Primary Examiner*—Stephen F. Husar
*Attorney, Agent, or Firm*—James A. Bargfrede

[57] ABSTRACT

A cogeneration and sludge drying system is provided using air first to generate power in a gas turbine, second in drying the sludge, and third in a boiler to make steam. Heat is recovered from the water vapor evaporated from the sludge and from hot air. The system utilizes conventional equipment and may be retrofitted to existing sludge drying processes at minimal expense and complexity.

11 Claims, 3 Drawing Figures

COGENERATION AND SLUDGE DRYING SYSTEM

SUMMARY OF THE INVENTION

In a conventional sewerage sludge drying process much energy is spent in heating air to evaporate water from the sludge without recovery of the energy as useful work. The present invention incorporates electric power generating equipment with the sludge drying process to gain greater efficiency and economy from the energy used. Known components are combined to give a new and useful result and the present invention may be retrofitted on existing sludge drying facilities. Heated air is used to generate power in a gas turbine, to dry the sludge, and to make steam in a boiler. Simplicity, economy, safety, and less pollution characterize the present invention.

DETAILED DESCRIPTION OF THE DRAWINGS

Figure 1:
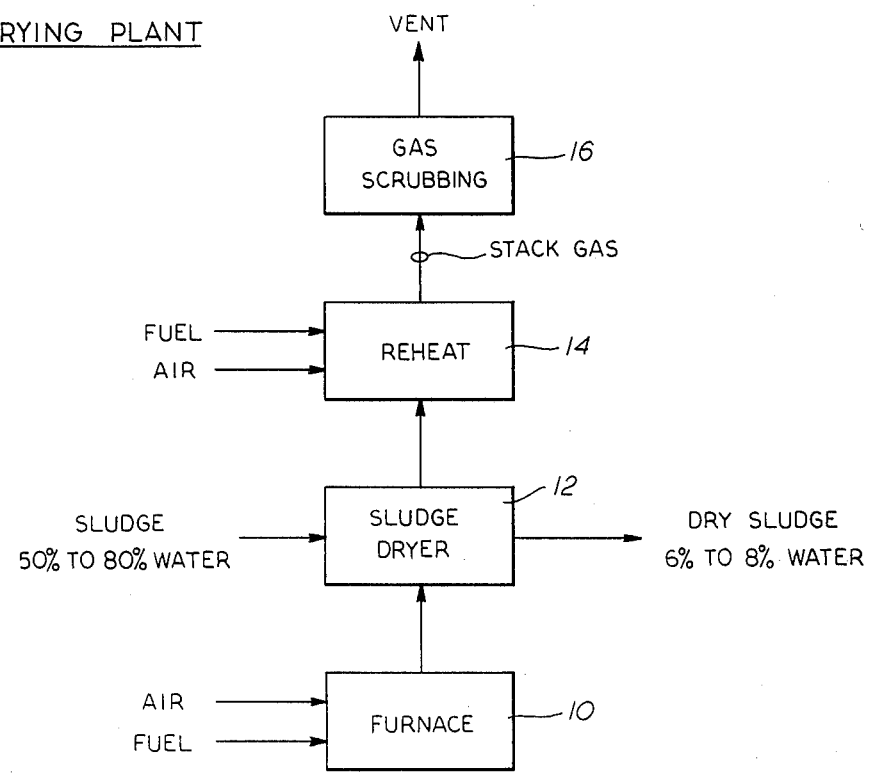
FIG. 1 is a block diagram of a typical sludge drying plant.

FIG. 1 is a block diagram of a typical sludge drying plant wherein furnace 10 having a source of air and fuel heats sludge dryer 12 which has an input of sludge comprised of about 50% to 80% water by weight and an output of dry sludge comprised of about 6% to 8% water by weight. Heated air from furnace 10 has a temperature of about 1200° F. Natural gas or fuel oil may be used as the fuel for furnace 10.

During the sludge drying process the heated air absorbs water and objectional odor compounds from the sludge and the heated air cools to between 250° F. and 300° F. as water is evaporated. The moist and odorous gas is passed through a reheat 14 whereby the gas is reheated to between 1300° F. and 1400° F. to destroy the odors. Gas scrubbing 16 cools the gas prior to discharging to the atmosphere. The dry sludge may be sold as fertilizer or disposed of in a land fill.

Thus, the usual sludge drying facility utilizes energy to heat air, evaporate water, and destroy odors, but none of the energy is recovered as useful work.

Also, as pollution regulations become more stringent regarding land fill with wet sludge and as land fill areas become more difficult to acquire, an economic system of drying sludge and destroying sludge odors will be in demand.

The present invention provides a cogeneration system to generate electric power and to dry sewerage sludge solves a long-felt and increasing need.

Figure 2:
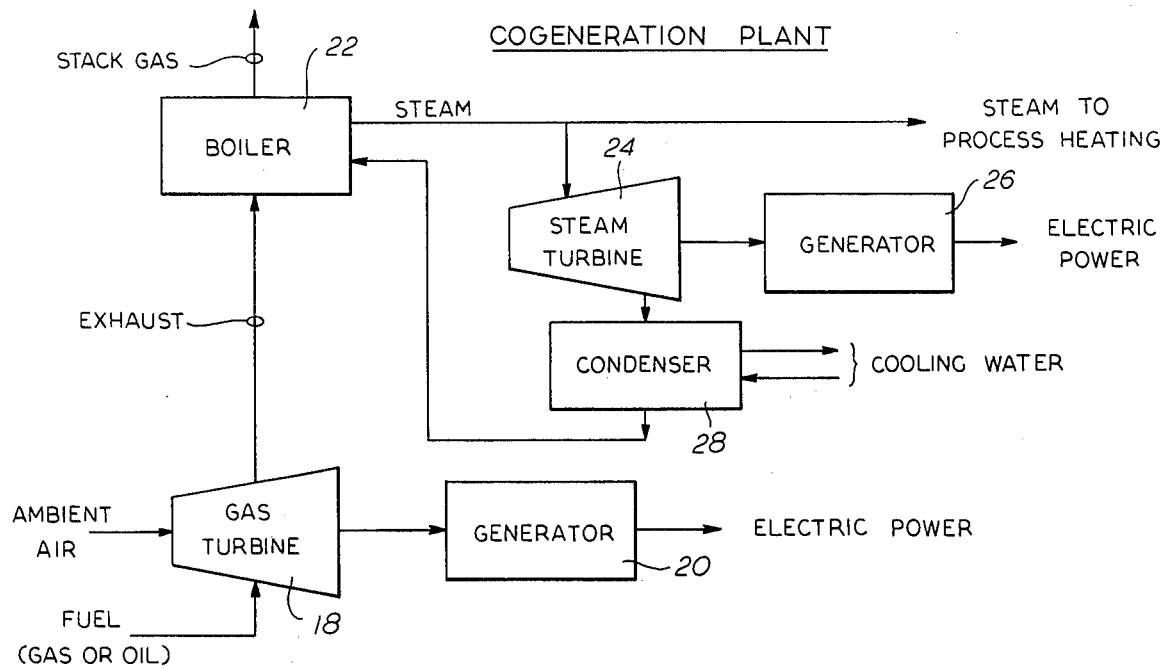
FIG. 2 is a block diagram of a typical cogeneration plant.

FIG. 2 is a block diagram of a typical cogeneration plant wherein a gas turbine 18 is provided with ambient air and fuel which may be natural gas or a liquid fuel. The gas turbine 18 drives generator 20 which provides electric power.

Exhaust from the gas turbine 18 goes to boiler 22 where steam is prepared to drive steam turbine 24 and to be used for process heating.

Generator 26 is driven by steam turbine 24 to produce electric power.

Condenser 28 is cooled with cooling water and is connected between the steam turbine 24 and boiler 22 as a water source for making steam in the boiler 22.

Thus, two generators are driven to provide electric power.

Figure 3:
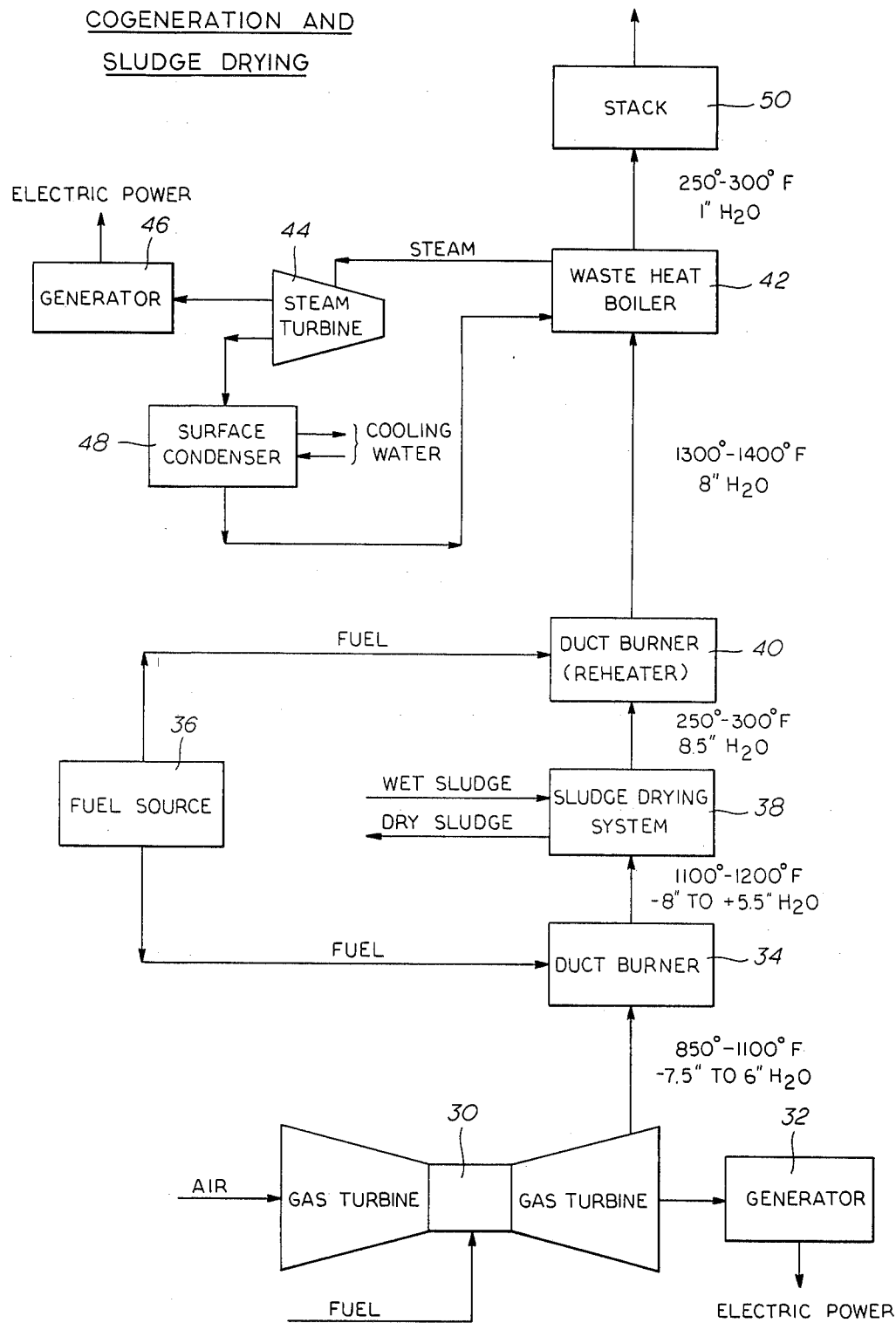
FIG. 3 is a block diagram of a combined cogeneration and sludge drying facility incorporating the present invention.

FIG. 3 is a block diagram of a combined cogeneration and sludge drying facility incorporating the present invention.

Air is compressed and heated by fuel fed to gas turbine 30 which drives generator 32 to provide electric power. The temperature of the exhaust air from gas turbine 30 will range from 850° F. to 1100° F. at a pressure of from about −7.5 inches to +6 inches of water depending upon the turbine efficiency, generator load, and other conditions. The turbine gas is heated by duct burner 34 fed with fuel from fuel source 36. Gas from duct burner 34 has a temperature of about 1200° F. with a pressure of from about −8 inches to +5.5 inches of water and is used for heat for the sludge drying system 38.

Moist air from the sludge drying system 38 has a temperature of between 250° F. and 300° F. at a pressure of 8½ inches of water and contains the odorizing compounds. Such moist air is fed to duct burner 40 which reheats the air to between 1300° F. and 1400° F. at a pressure of 8 inches of water to destroy the odorous compounds. The hot air from duct burner 40 is fed to a waste heat boiler 42 where steam is made to operate steam turbine 44 and generator 46. Surface condensor 48 is between steam turbine 44 and waste heat boiler 42 and cooled with cooling water thereby providing water to waste heat boiler 42. Exhaust from waste heat boiler 42 has a temperature of from 250° F. to 300° F. at a pressure of 1 inch of water and goes to a stack 50 for venting to the atmosphere.

Thus, the present invention allows recovery of sensible heat contained in water vapor evaporated from the sludge as well as heat from the hot air. The air, in effect, is used three times, first to generate power in the gas turbine, second in the sludge drying process, and third in the boiler to make steam.

The components used in practicing the present invention are conventional power generating and heat exchange equipment and a representative list of components and vendors of such components is set forth below:

| COMPONENT | VENDOR |
| --- | --- |
| Gas Turbine/Generator Sets | Solar Turbines Incorporated San Diego, California |
| Duct Burner | John Zinc Company Tulsa, Oklahoma |
| Waste Heat Boiler | Econo-Therm Energy Systems Corp. Minneapolis, Minnesota |
| Steam Turbine/Generator | Turbodyne Division Dresser Industries Wellsville, New York |
| Surface Condenser | Graham Manufacturing Co. Batavia, New York |
| Boiler Feed Pumps | Pacific Pump Division Dresser Industries |
| Deaerators | Chicago Heater Company, Inc. (Subsidiary of the Marley Co.) Mission, Kansas |
| Sludge Drying System | C. E. Raymond Division of Combustion Engineering Chicago, Illinois |

| COMPONENT | VENDOR |
| --- | --- |
| Duct Diverter Valves | Air Clean Damper Company Cincinnati, Ohio |
| Forced Draft Fans | Robinson Industries, Inc. Zelianople, Pennsylvania |
| Cooling Tower | Marley Company Kansas City, Kansas |
| Boiler Feed Water Make Up (Ion Exchange Unit) | Continental Water Systems, Inc. Odessa, Texas |
| Gas Turbine Inlet Air Filter/Silencer | American Air Filter Louisville, Kentucky |
| Gas Engine/Generator Sets | Caterpillar Engine Division Peoria, Illinois |

Equipment from other competent manufacturers may be used. Also, it will be apparent to those skilled in the art to which the present invention pertains that proper controls, although not shown, are required to control temperatures, pressures, and flows in the system.

The present invention also may be retrofitted into existing sludge drying processes using duct work and dampers to route the drying air while using much of the existing drying equipment.

One or more gas turbines operating in parallel and one or more boilers may be used depending on the sludge drying capacity requirements.

For smaller capacity sludge drying plants, gas engine generator sets may be used in lieu of gas turbine and generator sets to offset the lower thermal efficiencies of small gas turbines.

The present invention fulfills a need in a better, more efficient, and more economical manner while minimizing pollution.

Although a preferred embodiment of the invention has been shown and described, it will be appreciated that many modifications and changes may be made without departing from the spirit of the invention defined by the following claims.

I claim:

1. A system for cogeneration of electric power, said system including in combination, sludge drying means having an air intake and an air exhaust, an input of wet sludge, and an output of dry sludge, first generator means for generating electric power and connected to said air intake of said sludge drying means, and second generator means for generating electric power and connected to said air exhaust of said sludge drying means.

2. A system defined by claim 1 wherein said sludge drying means includes a first duct burner at the air intake and a second duct burner at the air exhaust.

3. A system for cogeneration of electric power and for sludge drying, said system including in combination a gas turbine having an air input and an air output, a first generator connected to said gas turbine, to generate electric power, sludge drying means having intake means and discharge means, said intake means being connected to said air output of said gas turbine, and waste heat boiler means connected to said discharge means of said sludge drying means.

4. A system defined by claim 3 wherein said intake means include a first duct burner and said discharge means include a second duct burner.

5. A system defined by claim 4 wherein said waste heat boiler means include steam turbine means and a second generator connected to said steam turbine means to generate electric power.

6. A system defined in claim 5 wherein said air output of said gas turbine has a temperature in the range from about 850° F. to 1100° F. and a pressure from about −7.5 inches to +6 inches of water.

7. A system defined by claim 6 wherein said first duct burner heats said air output of said gas turbine to a temperature in the range from about 1100° F. to 1200° F. and a pressure of from about −8 inches to +5.5 inches of water.

8. A system defined by claim 7 wherein said second duct burner heats air from a temperature in the range from about 250° F. to 300° F. and a pressure of 8½ inches of water to a temperature in the range from about 1300° F. to 1400° F. and a pressure of 8 inches of water.

9. A system defined by claim 8 wherein said waste heater boiler means include a boiler having air discharged therefrom in a temperature in the range from about 250° F. to 300° F. and a pressure of 1 inch of water.

10. A system defined by claim 9 wherein said waste heat boiler means include a steam turbine connected to said boiler, a second generator connected to said steam turbine to generate electric power, and a surface condenser connected between said steam turbine and said boiler.

11. A system defined by claim 3 wherein said sludge drying means further include a source of wet sludge and a product comprising dry sludge.

* * * * *